United States Patent [19]

Faase

[11] Patent Number: 5,411,061
[45] Date of Patent: May 2, 1995

[54] HEDDLE FRAME ASSEMBLY WITH RELEASABLE END BRACES

[75] Inventor: Gene E. Faase, Taylors, S.C.

[73] Assignee: Steel Heddle Mfg. Co., Greenville, S.C.

[21] Appl. No.: 168,754

[22] Filed: Dec. 16, 1993

[51] Int. Cl.⁶ .............................................. D03C 9/06
[52] U.S. Cl. ..................... 139/91; 403/264; 403/362; 403/374
[58] Field of Search ................... 139/91, 92; 403/231, 403/264, 374, 362

[56] References Cited

U.S. PATENT DOCUMENTS

| | | |
|---|---|---|
| 3,335,759 | 8/1967 | Koch . |
| 4,022,252 | 5/1977 | Ogura . |
| 4,144,910 | 3/1979 | Bader . |
| 4,230,159 | 10/1980 | Shimizu . |
| 4,349,052 | 9/1982 | Yaji et al. . |
| 4,741,367 | 5/1988 | Kitawaki ............................... 139/91 |
| 4,750,526 | 6/1988 | Faase et al. . |
| 5,005,607 | 4/1991 | Shimizu ................................ 139/91 |
| 5,297,589 | 3/1994 | Baumann ............................ 139/91 |

Primary Examiner—Andrew M. Falik
Attorney, Agent, or Firm—Dority & Manning

[57] ABSTRACT

A heddle frame has a pair of laterally extending slats and a pair of end braces connected to the slats to form a rectangular heddle frame. Each of the connections between the slats and the end braces includes an elongated opening defined within the end of the slat. The end brace includes an inwardly directed expansion foot configured on and extending essentially perpendicular from the end brace and having a width so as to be slidable within the elongated opening of the slat. A releasable locking member is configured to lock the extension foot within the slat in a locked position and to release the end brace from the slat in a released position, the locking member is disposed through the extreme outward edge of the slat and extends into the elongated opening of the slat. In one embodiment, the end brace is secured directly to the slat by a threaded bolt extending through the extreme outward edge of the slat. In an alternative embodiment, the end brace is indirectly secured to the slat by a threaded bolt and clamp block which is received within the slat. The clamp block defines a recess for receiving the inwardly directed extension foot of the end brace.

26 Claims, 4 Drawing Sheets

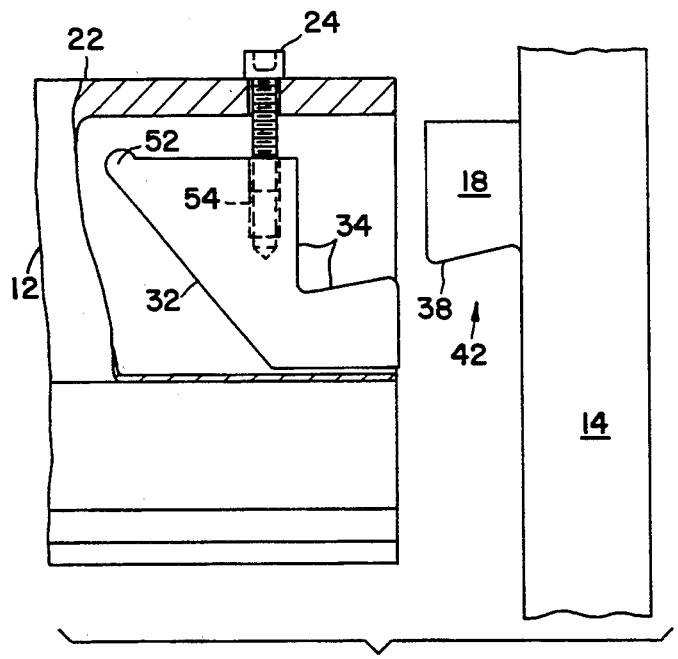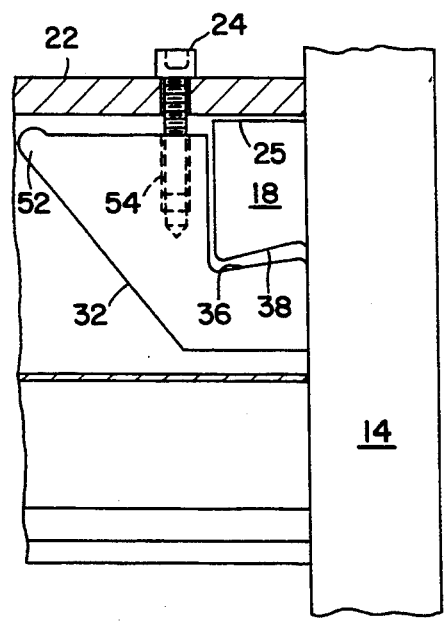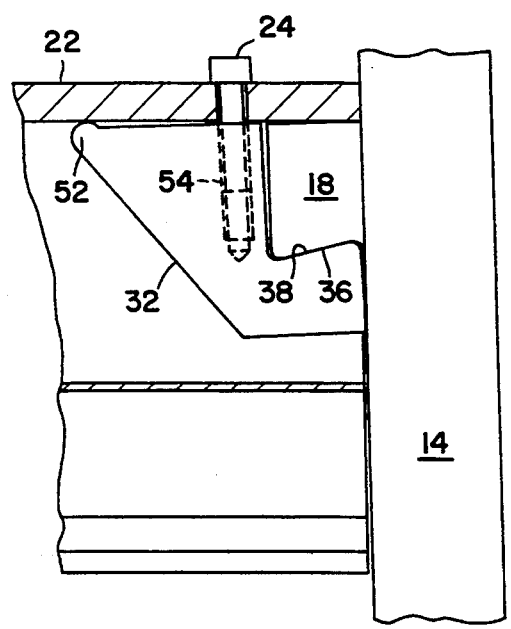

HEDDLE FRAME ASSEMBLY WITH RELEASABLE END BRACES

BACKGROUND OF THE INVENTION

The present invention relates to high speed weaving machines or looms, and more particularly to the heddle frames used in such high speed weaving machines.

Typically, heddle frames used in high speed weaving looms comprise a pair of end braces configured with a pair of laterally extending rails or slats. The connection between the end braces and slats is critical for proper operation of the weaving machines and has been a source of persistent problems in the field. In the past, the end braces have been rigidly attached to the top and bottom of the slates. The end braces were then free to slide in a guiding groove on a support of the weaving machine to form a shed during weaving operations. With the advent of high speed weaving machines, which may make as many as six hundred or more sheds per minute, the reciprocating motion of the heddle frame was very rapid and the inertia of the heddle frame, owing to its weight, was very great. This caused frequent breaking of the heddle frames, particularly at the connection between the end braces and top and bottom slats.

Conventionally, the top and bottom slats of the heddle frame have been made of lightweight hollow aluminum beams. The end braces are then fitted to the hollow aluminum beams. However, the aluminum slats or rails are subjective to a substantial amount of bending which exerts a flexing movement on the connection between the end braces and the slats. This flexing action results in fatigue of the components comprising the connection between the end braces and the slats, thereby causing frequent failure of the heddle frames.

Several attempts have been made to provide improved heddle frames. For example, U.S. Pat. No. 4,750,526 describes a quick release connection provided between the end braces and the laterally extending cross rails. This device utilizes a connector which is fixed within an opening in the cross rail having means for compressively gripping a projection which extends at a right angle from the end brace.

Another attempt to overcome the problems with conventional heddle frames is shown in U.S. Pat. No. 4,022,252. In this patent, the end brace has a metal core, a portion of which is covered with plastic to provide additional strength. A pair of joining pieces project from the strengthened portion of the core of the end brace as one body and form a tapered groove there between. These projections extend into the hollow body of the cross rail. The end brace is anchored to the cross rails by means of a wedge shaped member which is attached to the end brace by screws. The wedge shaped member enters the tapered groove formed by the projecting pieces so as to force the projecting pieces against the side walls of the cross rail, thereby locking the end brace firmly to the cross rail.

U.S. Pat. No. 4,230,159 describes a heddle frame wherein the end brace is joined to the cross rail by means of a plastic projection which extends into the hollow space of the cross rail and is pinned to the cross rail by a single pin which permits the projection to pivot about the pin thereby providing a flexible joint. A packing material is packed in the space between the end brace and across rail. This device permits flexibility of the joint but cannot be readily disassembled for drawing in of the work yarns or for replacement of component parts.

Thus, although a number of attempts have been made to provide a more reliable connection between the end brace and cross rails, such connections have only been achieved through relatively complicated and not easily disassembled connecting assemblies which do not provide adequate strength for the frame. For example, conventional connecting screws that extend through the end brace in a parallel or perpendicular direction tend to create relatively high stress points which are susceptible to failure in a relatively short time. Additionally, the location of drive elements on modern weaving machines overlaps and thereby prevents the use of several existing screw locations of conventional connecting assemblies.

The present invention provides a quick change end brace connection having extremely high fatigue resistance that eliminates the known disadvantages as discussed above.

OBJECTS AND SUMMARY OF THE INVENTION

It is a principle object of the present invention to provide an improved heddle frame having a quick change connecting assembly between the end braces and lateral slats wherein replacement of parts and drawing in of warped yarns is facilitated with minimum structural components.

Yet another object of the present invention is to provide a heddle frame connecting assembly which is able to absorb the loads and internal stresses created in high speed weaving machines without fatigue failure of the components thereof.

Still a further object of the present invention is to provide a readily disassembled connecting assembly for a heddle frame which may incorporate conventional drive elements thereby eliminating multiplicity of components and unnecessary weight.

Additional objects and advantages of the invention will be set forth in part in the description which follows, and in part will be obvious from the description, or may be learned by practice of the invention.

In accordance with the invention, the heddle frame is provided having a pair of laterally extending slats and a pair of end braces connected to the slats to form a generally rectangular frame. The lateral slats have elongated openings or recesses defined within the ends thereof. Preferably, the slats are hollow. The end braces include an inwardly directed extension foot formed thereon generally where the end brace meets the slat. The extension foot has the width so as to be slidable within the elongated opening in the slat. A single locking member is operably configured to lock the extension foot within the slat in a tightened position and to release the end brace from the slat in a loosened position. The locking member is disposed through the extreme outward edge of the slat and extends into the elongated opening of the slat. In a preferred embodiment, the locking member comprises a threaded bolt, or like threaded instrument.

In one preferred embodiment of the invention, the locking member physically engages with the extension foot formed on the end brace. In this embodiment, the extension foot may comprise a hole defined therein for receiving the bolt. The extension foot may further include a metal insert carried therein, the bolt extending through the hole into the metal insert for threaded engagement therewith.

In another preferred embodiment of the invention, the locking member may indirectly engage with the extension foot of the end brace through an independent clamp block. The clamp block has a width so as to be slidable within the elongated opening within the end of the slat and includes a recess defined therein for receiving the extension foot. The locking member physically engages the clamp block to secure the clamp block relative to the slat. In this manner, the extension foot is in turn secured within the clamp block recess and thereby fixed relative to the slat. Preferably, the clamp block recess and extension foot comprise adjacent slanted surfaces, or dove-tail sections. These slanted surfaces prevent the end brace from being pulled away from the slat once the locking member is tightened.

Preferably, the drive element of the heddle frame is incorporated with the connecting assembly. For example, the drive element may comprise a element which is formed on the extreme end of the end brace, preferably formed integral therewith. In an alternative embodiment, the drive element is disposed along a portion of the edge of the slat. In this embodiment, the locking member also locks the drive element to the slat. For example, the locking member may extend through the drive element and slat and into the extension foot in one embodiment, and into the clamp block in an alternative embodiment.

Whichever embodiment of the clamp block, drive element, or locking member, the end brace is easily separable from the slat merely by removing or loosening the locking member. For example, where the locking member comprises a threaded bolt or quick disconnect bolt, it need merely be loosened to separate the end brace from the slat. For example, in the embodiment wherein the clamp block is used to secure the extension, the threaded bolt is loosened to an extent wherein the end brace extension is released from the clamp block recess. In the embodiment wherein the threaded bolt extends through a hole in the extension foot into the metal insert carried thereby, the threaded bolt is loosened and removed to allow the end brace to be withdrawn from the slat. In the embodiment wherein the clamp block is utilized, the block may include an elongated relatively flexible portion rigidly connected to the slat. In this embodiment, the locking member can be loosened so that the end brace can be separated from the slat while the clamp block remains connected within the slat, the elongated flexible element allowing enough movement of the clamp block within the slat so as to release the extension foot from the recess.

BRIEF DESCRIPTION OF THE DRAWINGS

FIGS. 3a through 3c illustrate the sequential operation of the connecting assembly according to the invention;

DETAILED DESCRIPTION OF THE PREFERRED EMBODIMENTS

Figure 1:
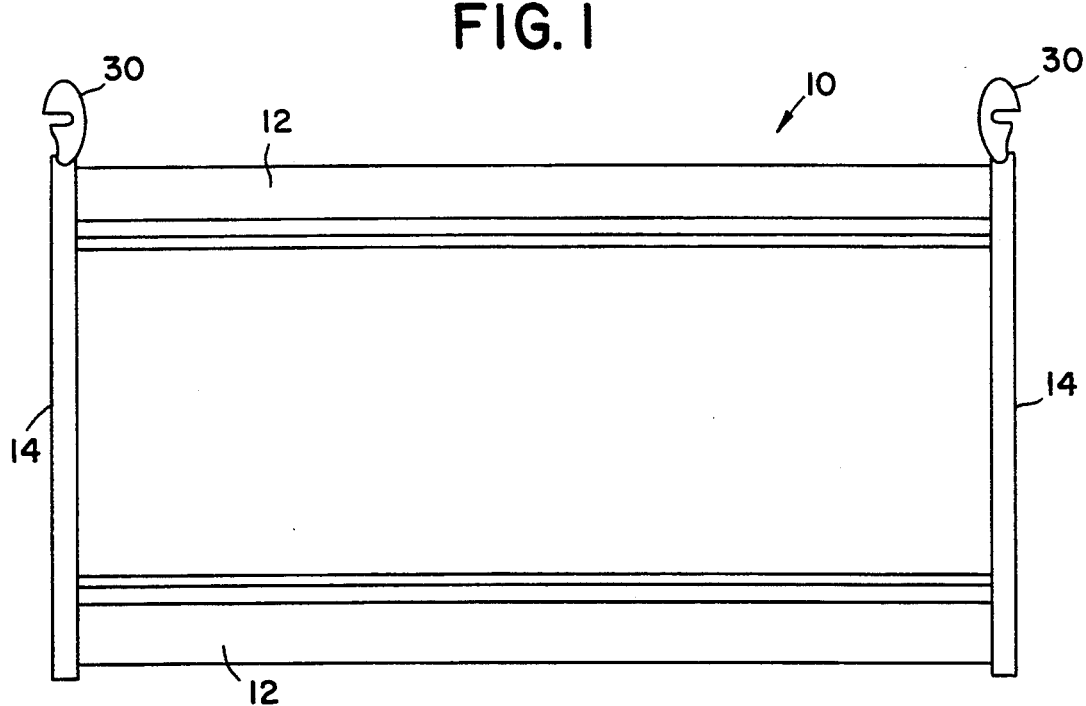
FIG. 1 is a perspective view of a heddle frame in general.

Reference will now be made in detail to the presently preferred embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. The numbering of components in the drawings is consistent throughout the application, with the same components having the same number in each of the drawings.

Figure 2:
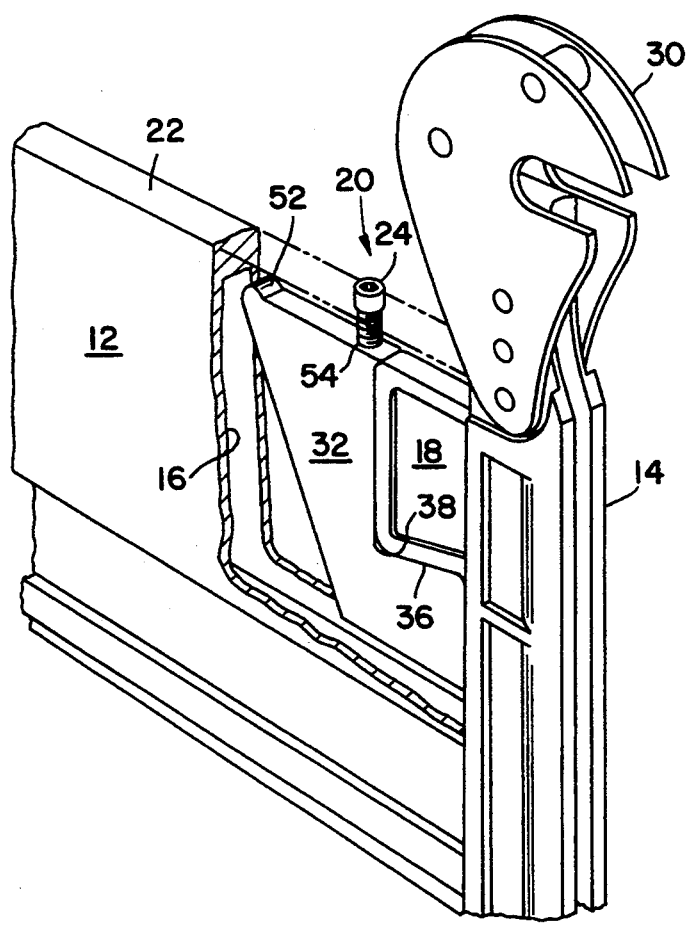
FIG. 2 is a partial cut-a-way view of a connecting assembly utilized in the heddle frame of FIG. 1.

Referring to FIGS. 1 and 2 in particular, the present invention includes a heddle frame 10. As is commonly understood, heddle frame 10 includes a pair of laterally extending slats 12 between a pair of end braces 14. The slats are connected to the end braces to form a generally rectangular frame. Slats 12 include an elongated opening 16 defined within the end of the slat. Preferably, slats 12 are formed of aluminum and are hollow. In this case, opening 16 extends throughout the entire length of slat 12. Slats 12 may also be formed of any suitable light weight rigid material.

End braces 14 according to the invention may also be formed of aluminum. In a preferred embodiment, end braces 14 are formed of a reinforced composite material, for example a fiber reinforced plastic material. Any number of such materials are known in the art and may be suitable for the present invention. End braces 14 have an inwardly directed extension foot 18 configured thereon. Foot 18 is preferably formed integral with end brace 14 but, may comprise a separate component fixed thereto. Foot 18 is inwardly extending in that it is preferably oriented perpendicular to the longitudinal line of the end brace and is directed inwardly towards the interior of the heddle frame 10. Foot 18 also has a width which is less than the opening 16 defined in slat 12. In this manner, foot 18 is slidable within slat 12.

Extension foot 18 can take on any manner of shape. However, in preferred embodiments of the invention, foot 18 has at least one slanted or angled surface 38, as particularly seen in FIGS. 2 and 3. Surface 38 is angled or slanted with respect to a horizontal line drawn through the extension foot 18. Surface 38 may be considered as a dove-tail or partial dove-tail configuration. Although the figures only depict one side of foot 18 as having such a slanted or angled surface, it is within the scope of the invention that any number of the sides of 18 be formed with the inner locking slanted surface. For example, the entire extension foot 18 may be configured as a dove-tail or like configuration. As will be explained further on, extension foot 18 comprises the element by which end brace 14 is indirectly fixed to slat 12. Depending on the manner in which foot 18 is secured within end brace 12, any manner of configuration or shape of foot 18 is possible.

The invention also includes a releasable locking member, generally 20, which is operably configured to lock extension foot 18 within slat 12 in a locked position thereof, and to easily and readily release end brace 14 from slat 12 when in a released or unlocked position. Locking member 20 is disposed through the extreme outward edge 22 of the slat and extends into elongated opening 16 of slat 12, as particularly seen in FIGS. 2 and 3. In a preferred embodiment of the invention, locking member 20 comprises a threaded bolt 24. Bolt 24 may comprise for, for example, a hex bolt. However, it should be understood that any manner of engaging or locking pin or like device may be used.

Figure 6:
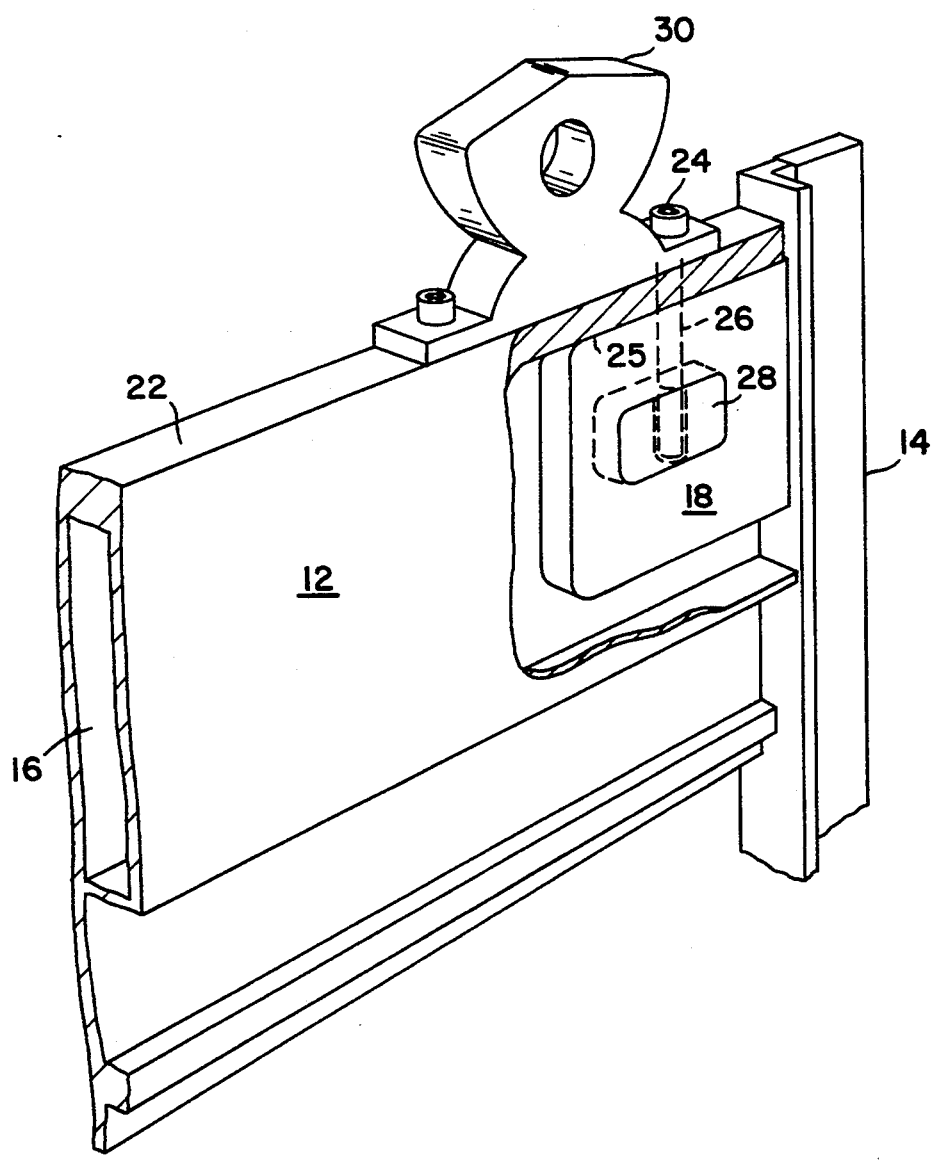
FIG. 6 illustrates an embodiment of the connecting assembly according to the invention wherein the locking member directly engages the extension foot of the end brace.

In one preferred embodiment, bolt 24 directly physically engages extension foot 18 of end brace 14. This embodiment is particularly illustrated in FIG. 6. Referring to FIG. 6, extension foot 18 includes an upper facing surface 25 which, when foot 18 is inserted within slat 12, is adjacent the outer edge 22 of slat 12. A hole 26 is defined in foot 18 for receipt of threaded bolt 24. Bolt 24 extends through the edge 22 of slat 12 into foot 18. To increase the reliability of bolt 24 and provide a better biting surface therefor, a metal insert 28 is preferably embedded within foot 18. Insert 28 has a threaded hole defined therein for receipt of bolt 24. In an alternative embodiment however, hole 26 within foot 18 may itself be threaded.

Figure 4:
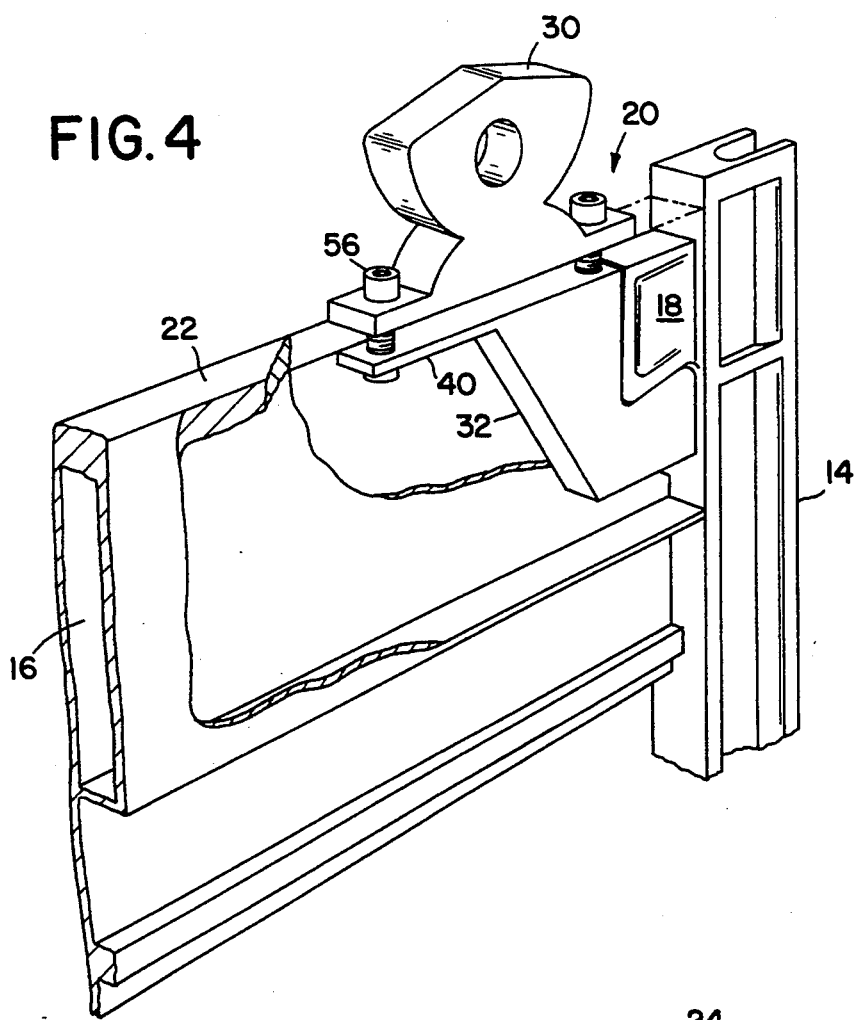
FIG. 4 illustrates a partial cut-a-way view of an alternative embodiment of the connecting assembly.
Figure 5:
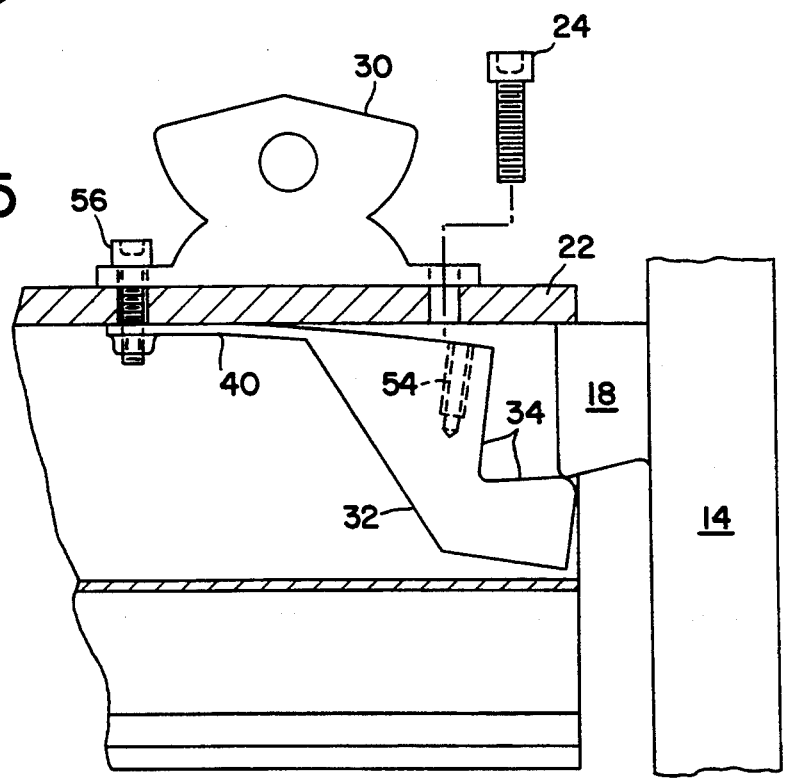
FIG. 5 conceptionally illustrates the operation of the device of FIG. 4.

Typically, drive elements 30 for the heddle frames 10 are disposed at some position along the top of the heddle frames. For example, drive element 30 may be formed at the extreme end of end brace 14, as particularly seen in FIG. 2, or may be disposed along a section of the edge 22 of slat 12. Referring to FIGS. 4 through 6, in the embodiments of the heddle frame wherein the drive element 30 is disposed along the slat 12, typically bolts 24 are used to secure the drive element to the slat 12. With the present invention, the bolt 24 serves the dual purpose of also securing the end brace to the slat by way of the end brace extension foot 18. The end brace is easily and readily separable from slat 12 by simply removing bolt 24 in the embodiment of FIG. 6.

In alternative preferred embodiments of the invention as shown in FIGS. 2 through 5, locking member or bolt 24 secures or fixes extension foot 18 within slat 12 indirectly through means of an independent clamp block 32. Clamp block 32 is preferably formed of aluminum or some other strong lightweight material and has a recess 34 formed therein. Recess 34 essentially defines a receiving space for extension foot 18, as is particularly seen in the series of FIG. 3. Preferably, recess 34 includes at least one slanted or angled surface 36 which essentially matches surface 38 of foot 18. Depending upon the shape of foot 18, recess 34 can take on any manner of corresponding shape. Clamp block 32 includes a threaded bolt hole 54 defined therein for receipt of the threaded bolt 24.

The operation of the clamp block for indirectly securing end brace 14 to slat 12 is particularly illustrated in the series of FIG. 3. FIG. 3a illustrates the end brace 14 separated from slat 12. Bolt 24 is in its loosened or released state so that clamp block 32 is not drawn against the upper edge 22 of slat 12. It should be noted that it is not necessary to completely remove bolt 24 from clamp block 32 in order to remove or separate end brace 14 from slat 12.

FIG. 3b illustrates the process of securing the end brace relative to the slat. Extension foot 18 is inserted within opening 16 of the slat so that the top surface of foot 18 generally abuts upper edge 22 of slat 12. Bolt 24 is then tightened which draws clamp block 32 upwards toward edge 22 of slat 12. In so doing, slanted edges 36 and 38 meet and clamp block 32 tends to draw foot 18 upward and inward with respect to slat 12. FIG. 3c illustrates the components in their locked or assembled position. With the clamp block 32 drawn completely against upper edge 22, foot 18 is secured within recess 34 of the clamp lock and securely held within slat 12. The slanted edges 38 and 36 prevent end brace 14 from being pulled away from slat 12.

It should be understood that the invention would still function without the slanted surfaces 38 and 36 but would be less reliable. For example, if the engaging surfaces between the foot 18 and clamp block 32 were completely horizontal, end brace 14 would still be fixed to slat 12 by the action of clamp block 32 forcing the foot against upper edge 22 of the slat. However, end brace 14 might be separated or pulled apart from slat 12 in this arrangement since a locking or engagement surface is not provided. Thus, it is preferred to provide foot 18 with a locking engagement surface and to define a recess within the clamp block 32 matching the locking engaging surface of the foot. For example, foot 18 may be defined as a dove tail with recess 34 being defined as a complimenting dove tail recess. In this manner, the foot, and thus end brace, is secured relative to slat 12 and end brace 14 cannot be laterally pulled away from slat 12.

Preferably, clamp block 32 also includes a rocker point 52 defined along the top surface thereof. Referring particularly to the series of FIG. 3, it is illustrated that rocker point 52 provides a pivot point for the clamp block wherein as the block 32 is pulled upwardly by means of tightening bolt 24, the clamp block 32 tends to rotate to a degree about rocker 0.52, This action causes the clamp block 32 to cant within the slat 12 and thereby pulls extension foot 18 inwardly within recess 16 of slat 12.

As mentioned above, with the embodiment of the invention utilizing the clamp block 32 as described, locking member 24 may also comprise the bolt or locking member utilized to secure a drive element 30 along the edge of slat 12. Referring particularly to FIGS. 4 and 5, bolt 24 extends through an extension of drive element 30, through the edge 22 of slat 12, and into the threaded hole 54 defined within clamp block 32. In the embodiment illustrated, clamp block 32 may further comprise a relatively long thin and flexible component 40. By way of element 40, clamp block 10 is more or less permanently secured to upper edge 22 while still allowing separation of end brace 14 from slat 12 by still only loosening or removing the single locking member 24. Element 40 provides enough flexibility to allow the clamp block 32 to have a degree of vertical movement within recess 16 whereby extension foot 18 can be pulled away from recess 34, as particularly shown in FIG. 5. This arrangement may be preferred when, for example, two bolts 24, 56 are utilized to secure drive element 30 to slat 12. In any event, end brace 14 is still separable from slat 12 merely by loosening the single locking member.

It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

What is claimed is:

1. A heddle frame having a pair of laterally extending slats and a pair of end braces connected to said slats to form a generally rectangular frame, wherein each of the connections between said slats and said end braces comprises:

an elongated opening defined within the end of said slats;

an inwardly directed extension foot configured on and extending essentially perpendicular from said end brace, said extension foot having a width so as to be slidable within said elongated opening of said slat; and a single releasable locking member operably configured to lock said extension foot within said slat in a locked position and to release said end brace from said slat in a released position, said locking member disposed through an outward edge of said slat and extending into said elongated opening of said slat, said extension foot comprising a hole defined therein for receiving said locking member and further comprising an insert carried therein, said locking member extending through said hole into said insert for locking engagement with said insert.

2. The heddle frame as in claim 1, wherein said locking member comprises a threaded bolt.

3. The heddle frame as in claim 2, wherein said insert comprises a metal insert having a threaded hole defined therein.

4. The heddle frame as in claim 1, further comprising a drive element configured on an extreme end of said end brace.

5. The heddle frame as in claim 1, further comprising a drive element configured along said outward edge of said slat, said locking member also securing said drive element to said slat.

6. A heddle frame having a pair of laterally extending slats and a pair of end braces connected to said slats to form a rectangular frame, wherein each of the connections between said slats and said end braces comprises:

an elongated opening defined within the end of said slats;

an inwardly directed extension foot configured on said end brace generally where said end brace meets said slat, said extension foot being sized so as to be slidable within said elongated opening of said slat, said extension foot further comprising an engagement surface;

an independent clamp block having a width so as to be slidable within said elongated opening, said clamp block further defining a locking surface which is mateable with said extension foot engagement surface in such a manner so that when said clamp block is secured within said slat said clamp block locking surface engages with said extension foot engagement surface locking said end brace to said slat; and at least one securing device disposed through an outward edge of said slat and configured to secure said extension foot within said slat by engaging drawing said clamp block towards said outward edge of said slat, wherein said end brace is separable from said slat by loosening of said securing device.

7. The heddle frame as in claim 6, wherein said end brace extension foot comprises a shaped element formed integral with said end brace, said extension foot engagement surface comprising an angled side with respect to a horizontal line through said foot, said clamp block locking surface comprising an angled surface generally opposite to said extension foot angled side.

8. The heddle frame as in claim 7, wherein said shaped element is formed as a partial dove-tail element, said clamp block locking surface formed as a matching partial dove-tail recess.

9. The heddle frame as in claim 6, wherein said clamp block comprises a recess formed therein for receiving said extension foot.

10. The heddle frame as in claim 6, wherein said securing device comprises a threaded member extending through the outward edge of said slat end into said clamp block, whereby as said clamp block is drawn towards said outward edge of said slat by way of said threaded member said clamp block locking surface engages said extension foot engagement surface and draws and locks said end brace against said slat.

11. The heddle frame as in claim 10, wherein said clamp block further comprises a rocker point defined along the surface thereof adjacent said outward edge of said slat, said rocker point spaced apart from said threaded member so that said clamp block pivots about said rocker point as it is drawn towards said slat end.

12. The heddle frame as in claim 10, wherein said threaded member includes a removable bolt, said clamp block including a threaded bolt hole defined therein for receiving said bolt.

13. The heddle frame as in claim 6, further comprising a drive element fixed to said end brace.

14. The heddle frame as in claim 13, wherein said drive element is formed integral with said end brace.

15. The heddle frame as in claim 6, further comprising a drive element connected to said slat generally adjacent said end brace, said securing device securing said drive element to said slat and said clamp block.

16. The heddle frame as in claim 15, wherein said clamp block includes an inwardly directed relatively flexible extension member, and a second said securing device configured to secure said drive element to said slat and said flexible extension member, whereby said end brace can be pulled away from said clamp block by releasing of said one securing member while said second securing member maintains said drive element, said slat, and said flexible extension member secured together.

17. The heddle frame as in claim 6, wherein said clamp block is adapted to remain connected to said slate while said securing device is loosened.

18. The heddle frame as in claim 17, wherein said securing device comprises a threaded bolt which engages in a threaded hole defined in said clamp block, whereby upon loosening of said bolt said end brace is separable from said slat with said bolt still engaging said clamp block.

19. The heddle frame as in claim 17, further comprising a second said securing device securing said clamp block to said slat, wherein said clamp block is separable from said end brace by loosening of said one securing device while said clamp block remains connected to said slat through said second securing device.

20. An assembly for connecting together slats and end braces to form a heddle frame, said assembly comprising:

an end brace extension adapted to be configured to an end brace and having a width so as to be slidable within a hollow recess defined within a heddle slat;

a releasable locking device adapted to be disposed through an outward edge of the heddle slat; and a clamp block having a width so as to also slide within said hollow recess, said clamp block comprising a recess defined therein for receiving said end brace extension, said locking device physically engaging with said clamp block wherein said clamp block is configured to be drawn against said slat thereby locking said end brace extension within said recess fixing said end brace relative said slat.

21. The assembly as in claim 20, wherein said clamp block recess defines a slanted surface, said end brace extension defines a matching slanted surface, and said locking device comprises a threaded member for drawing said clamp block against the heddle slat.

22. The assembly as in claim 20, further comprising a drive element configured to be connected to the heddle end brace.

23. The assembly as in claim 20, further comprising a separable drive element configured to be connected to said heddle slat, said locking device securing said drive element and said clamp block to the heddle slat.

24. The assembly as in claim 23, wherein said locking device comprises a threaded bolt, said end brace extension being separable from said clamp block recess by loosening of said threaded bolt.

25. The assembly as in claim 24, further comprising a second threaded bolt configured to secure said drive element and said clamp block to the heddle slat, said end brace extension being separable from said clamp block recess by loosening one of said bolts.

26. The assembly as in claim 20, wherein said clamp block further comprises a rocker point defined on the surface thereof said rocker point defining a protruding pivot point for said clamp block.

* * * * *